(12) United States Patent
Wolf et al.

(10) Patent No.: US 11,148,527 B2
(45) Date of Patent: Oct. 19, 2021

(54) BEARING ASSEMBLY INCLUDING A RETAINING RING AND DRIVESHAFT ASSEMBLY INCLUDING A RETAINING RING

(71) Applicant: Honda Motor Co., Ltd., Tokyo (JP)

(72) Inventors: Henry D. Wolf, Dublin, OH (US); Dustin L. Hinders, Lakeview, OH (US); Dustin M. Schroeder, Milford Center, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 16/508,014

(22) Filed: Jul. 10, 2019

(65) Prior Publication Data
US 2021/0010541 A1    Jan. 14, 2021

(51) Int. Cl.
*B60K 17/24*  (2006.01)
*F16C 35/06*  (2006.01)
*F16C 33/78*  (2006.01)
*F16C 35/063* (2006.01)

(52) U.S. Cl.
CPC .......... *B60K 17/24* (2013.01); *F16C 33/7886* (2013.01); *F16C 35/063* (2013.01); *F16C 2226/12* (2013.01); *F16C 2326/06* (2013.01)

(58) Field of Classification Search
CPC .......... F16C 3/02; F16C 27/06; F16C 27/066; F16C 33/7886; F16C 35/063; F16C 35/07; F16C 35/073; F16C 2226/12; F16C 2326/06; B60K 17/24

USPC .......................................................... 464/178
See application file for complete search history.

(56) References Cited

U.S. PATENT DOCUMENTS

| 4,796,722 A    | 1/1989 | Kumagai |
| 6,179,473 B1   | 1/2001 | Ponson et al. |
| 6,276,837 B1 * | 8/2001 | Iwano ............... F16C 27/066 |
|                |        | 384/488 |

(Continued)

FOREIGN PATENT DOCUMENTS

| CN | 202451611 U    | 9/2012 |
| DE | 102014213924 A1 | 1/2016 |

(Continued)

OTHER PUBLICATIONS

Machine Translation of JP-60008521-A (Year: 1985).*

*Primary Examiner* — Alan B Waits
(74) *Attorney, Agent, or Firm* — Kenealy Vaidya LLP (57) ABSTRACT

A bearing assembly can support a rotating shaft on a vehicle structure and can include a rolling element bearing that has an inner race configured to be press fit on the rotating shaft. An outer race can surround the inner race and be configured to be mounted on the vehicle structure. A plurality of rolling elements can be located between the inner race and the outer race. A retaining ring can be configured to be press fit on the rotating shaft and abut the inner race when the rolling element bearing and the retaining ring are press fit on the rotating shaft. The press fit between the retaining ring and the rotating shaft can contribute to the press fit between the inner race and the rotating shaft such that the retaining ring and the rolling element bearing together distribute a load input by the rotating shaft to the vehicle structure.

20 Claims, 7 Drawing Sheets

(56) References Cited

U.S. PATENT DOCUMENTS

| | | | | |
|---|---|---|---|---|
| 6,820,876 B2* | 11/2004 | Iwano | ............... | F16J 3/046 |
| | | | | 277/635 |
| 6,913,540 B2 | 7/2005 | Ihara et al. | | |
| 7,896,554 B2* | 3/2011 | Yamada | ............ | F16C 27/066 |
| | | | | 384/536 |
| 7,922,394 B2* | 4/2011 | Hirakawa | ......... | F16C 33/805 |
| | | | | 384/536 |
| 8,628,250 B2* | 1/2014 | Oinuma | ............ | F16C 27/066 |
| | | | | 384/536 |
| 8,961,024 B2 | 2/2015 | Keda | | |
| 2008/0267549 A1* | 10/2008 | Yamada | ............ | F16C 27/066 |
| | | | | 384/536 |
| 2008/0293502 A1* | 11/2008 | Oinuma | ............ | F16C 35/047 |
| | | | | 464/170 |
| 2010/0244388 A1* | 9/2010 | Nakagawa | ......... | F16C 33/805 |
| | | | | 277/559 |
| 2011/0133413 A1* | 6/2011 | Kato | ................ | F16J 15/3232 |
| | | | | 277/565 |
| 2013/0068921 A1* | 3/2013 | Ikeda | ............... | F16C 27/066 |
| | | | | 248/635 |
| 2016/0108968 A1* | 4/2016 | Koguchi | ......... | F16C 33/7879 |
| | | | | 384/536 |

FOREIGN PATENT DOCUMENTS

| | | | | |
|---|---|---|---|---|
| JP | 60008521 A | * | 1/1985 | ......... F16C 35/063 |
| JP | 2007245914 A | | 9/2007 | |
| JP | 6152774 B2 | | 6/2017 | |
| JP | 2018083515 A | | 5/2018 | |
| KR | 20160013384 A | | 2/2016 | |

* cited by examiner

BEARING ASSEMBLY INCLUDING A RETAINING RING AND DRIVESHAFT ASSEMBLY INCLUDING A RETAINING RING

BACKGROUND

The disclosed subject matter relates to a bearing assembly for rotatably supporting a driveshaft assembly. More particularly, the disclosed subject matter relates to methods and apparatus that can secure the bearing assembly to the driveshaft assembly.

SUMMARY

Some embodiments are directed to a bearing assembly for supporting a rotating shaft on a vehicle structure. The bearing assembly can include a rolling element bearing and a retaining ring. The rolling element bearing can include an inner race configured to be press fit on the rotating shaft, an outer race surrounding the inner race and configured to be mounted on the vehicle structure, and a plurality of rolling elements located between and engaging each of the inner race and the outer race. The retaining ring can be configured to be press fit on the rotating shaft and abut the inner race when the rolling element bearing and the retaining ring are press fit on the rotating shaft. The press fit between the retaining ring and the rotating shaft can contribute to the press fit between the inner race and the rotating shaft such that the retaining ring and the rolling element bearing together distribute a load input by the rotating shaft to the vehicle structure.

Some embodiments are directed to a driveshaft assembly for a vehicle including a frame assembly, a power source mounted to the frame assembly, and at least one driven wheel connected on the frame assembly. The driveshaft assembly can include a front driveshaft, a center driveshaft and a center bearing support assembly. The front driveshaft can be connected to drive the at least one driven wheel. The center driveshaft can be configured to transmit torque from the power source to the front driveshaft. The center bearing support assembly can be configured to rotatably support the center driveshaft relative to a frame assembly. The center bearing support assembly can include a bearing press fit on the center driveshaft, and a retaining ring press fit on the center driveshaft and abutting the bearing such that the retaining ring and the bearing together distribute a load input by the center driveshaft to the frame assembly via the bearing support assembly.

Some embodiments are directed to a bearing assembly for supporting a rotatable driveshaft on a vehicle structure. The bearing assembly can include a bearing and a retaining ring. The bearing that is configured to be press fit on the rotatable shaft. The retaining ring can abut the bearing when the retaining ring and the bearing are mounted on the rotatable shaft. The retaining ring can includes a first hollow cylindrical portion that is configured to be press fit onto the rotatable shaft, and a second hollow cylindrical portion that is spaced away from the rotatable shaft when the retaining ring is mounted on the rotatable shaft.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
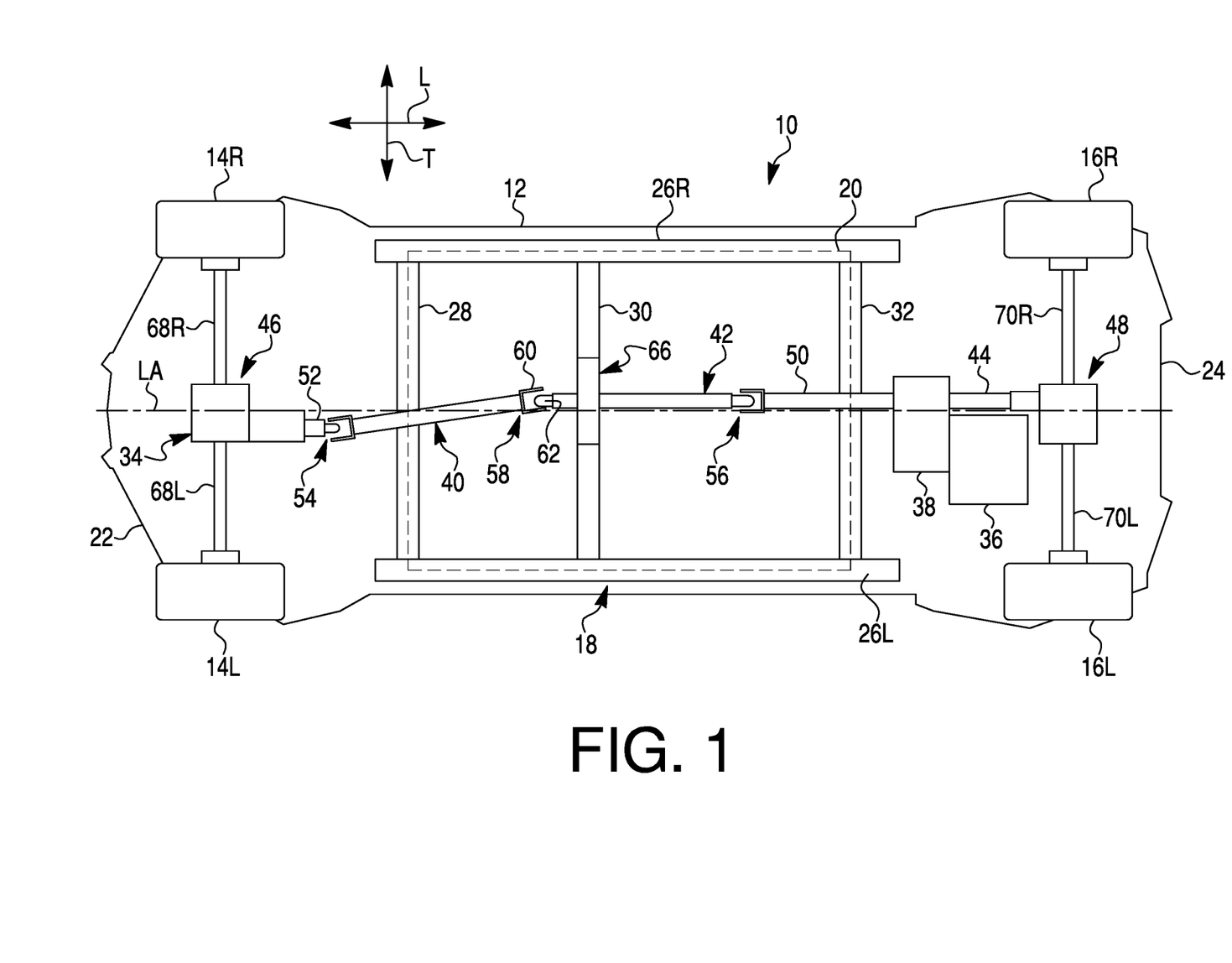
FIG. 1 is a schematic view of a vehicle in accordance with the disclosed subject matter.

FIG. 1 illustrates an embodiment of a vehicle 10 made in accordance with principles of the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (S×S, or S×S ATV). However, the disclosed vehicle 10 can be any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

The vehicle 10 can include a longitudinal direction L, a transverse direction T and vertical direction. (The vertical direction can be orthogonal to each of the longitudinal direction L and the transverse direction T). Referring to FIG. 1, the vehicle 10 can include a body 12, a pair of front wheels, 14L, 14R, a pair of rear wheels 16L, 16R and a frame assembly 18. The body 12 and the frame assembly 18 can surround or extend about a perimeter of a passenger space 20. The perimeter of the passenger space 20 is shown in phantom. The passenger space 20 can include one or more seats and the controls, such as but not limited to a steering wheel, a brake pedal, an accelerator pedal and a transmission switch/lever, for operating the vehicle 10. In the exemplary embodiment of FIG. 1, the passenger compartment can accommodate a driver and a passenger in a single row of two seats. However, exemplary embodiments can include two more rows of seats, with each row of seats including two or more seats. The frame assembly 18 can include a roll cage configured to extend around and above the passenger space 20. The vehicle 10 can include a front end 22 and a rear end 24 spaced from the front end 22 along a longitudinal direction L of the vehicle 10.

The frame assembly 18 can include a pair of longitudinal frame members 26L, 26R and a plurality of transverse frame members 28, 30, 32. The longitudinal frame members 26L, 26R can extend along the longitudinal direction L of the vehicle 10. The longitudinal frame members 26L, 26R can be spaced apart in the traverse direction T of the vehicle 10. Each of the transverse frame members 28, 30, 32 can extend in the transverse direction T of the vehicle 10. The transverse frame members 28, 30, 32 can be spaced apart from each other in the longitudinal direction L of the vehicle 10. Each of the transverse frame members 28, 30, 32 can be connected to and extend from each of the longitudinal frame members 26L, 26R.

The vehicle 10 can include a powertrain 34. The powertrain 34 can include a power source 36, a transmission 38, a front propeller shaft 40, a center propeller shaft 42, a rear propeller shaft 44, a front final drive assembly 46 and a rear final drive assembly 48. The power source 36 can be configured to produce an output torque. The transmission 38 can be connected to the power source 36 by a shaft with or without a clutch assembly between the shaft and either of the transmission 38 or the power source 36 and configured to receive an output torque from the power source 36 and convert the output torque to a front drive torque. The propeller shafts 40, 42, 44 can be referred to as shafts or driveshafts. The front propeller shaft 40 and the center propeller shaft 42 can be connected to the transmission 38 and configured to transmit the front drive torque to the front final drive assembly 46. The front final drive assembly 46 can be located adjacent to the front end 22 of the vehicle 10 and configured to output the front drive torque to the front wheels 14L, 14R. The transmission 38 can be configured to output a rear drive torque in addition to the front drive torque. The rear propeller shaft 44 can be connected to the transmission 38 and configured to transmit the rear drive torque to the rear final drive assembly 48. The rear final drive assembly 48 can be located adjacent to the rear end 24 of the vehicle 10 and configured to output the rear drive torque to the rear wheels 16L, 16R.

The vehicle 10 can be configured as a four-wheel drive vehicle in which the power source 36 drives the front wheels 14L, 14R and the rear wheels 16L, 16R. However, the vehicle 10 can be configured as a two-wheel drive vehicle where only the front wheels 14L, 14R are driven by the power source 36, or only the rear wheels 16L, 16R are driven by the power source 36. An alternative embodiment of the vehicle 10 can have a first drive mode in which the power source 36 only drives the rear wheels 16L, 16R and a second drive mode in which the power source drives the front wheels 14L, 14R and the rear wheels 16L, 16R.

The power source 36 can be an internal combustion engine, an electric motor, or a hybrid of an internal combustion engine and an electric motor. The power source 36, especially when configured as an internal combustion engine or a hybrid power source, can have the engine output axis oriented in the longitudinal direction L or in a traverse direction T of the vehicle. The engine can be mounted forward of the front axles, rearward of the rear axles, or intermediate the front and rear axles. In the exemplary embodiment of FIG. 1, the power source 36 is configured as a longitudinally-oriented and intermediate-mounted internal combustion engine.

The transmission 38 can be an automatic transmission, a manual transmission, or a semi-automatic transmission. A coupling between the power source 36 and the transmission 38 can permit selective connection and disconnection of the transmission to and from the output torque, in any appropriate manner such as but not limited to a friction disc clutch and a torque converter. The transmission 38 can include a speed ratio assembly that is configured to convert the output to a drive torque. The speed ratio assembly can be a stepped speed ratio assembly or a continuously variable speed ratio assembly.

The rear propeller shaft 44 can extend into the respective housing of each of the transmission 38 and the rear final drive assembly 48. The rear propeller shaft 44 can be connected to a respective shaft inside each of the transmission 38 and the rear final drive assembly 48. Alternatively, one or both of the transmission 38 and the rear final drive assembly 48 can include a shaft that extends outside of the respective one of the housings that is connected to the rear propeller shaft 44 at a location that is outside each of the transmission 38 and the rear final drive assembly 48.

The center propeller shaft 42 can extend from the transmission 38 to the front propeller shaft 40 along the longitudinal direction L of the vehicle 10. The center propeller shaft 42 can be connected to a shaft of the transmission 38 and at a location that is inside of or outside of the respective one of the housings of the transmission 38 and the front final drive assembly 32. In the exemplary embodiment of FIG. 1, the transmission 38 can include a transmission output shaft 50. The center propeller shaft 42 can be connected to the transmission output shaft 50.

The front propeller shaft 40 can extend from the center propeller shaft 42 to the front final drive assembly 46 along the longitudinal direction L of the vehicle 10. The front propeller shaft 40 can be connected to a shaft of the front final drive assembly 46 at a location that is inside of or outside of the housing of the front final drive assembly 46. The front final drive assembly 46 can include a front input shaft 52. The front propeller shaft 40 can be connected to each of the center propeller shaft 42 and the front input shaft 52.

The powertrain 34 can further include a plurality of universal joint assemblies 54, 56, 58 that connect the shafts 40, 42, 50, 52 to each other. Each of the first and second universal joint assemblies 54, 56 can transmit torque to and from the propeller shafts 40, 42 if the rotational axis of the propeller shafts 40, 42 are at an angle with respect to the rotational axis of either or both of the transmission output shaft 50 and the front input shaft 52. The angle can be a static angle where the rotational axes are fixed with respect to each other. Alternatively, the angle can be a dynamic angle that varies because one of the shafts 40, 44 can pivot about the universal joint with respect to the other shaft.

The third universal joint assembly 58 can connect the center propeller shaft 42 to the front propeller shaft 40. The third universal joint assembly 58 can transmit torque to and from the propeller shafts 40, 42 if the rotational axis of the front propeller shaft 40 is at an angle with respect to the rotational axis of the center propeller shaft 42. The angle can be a static angle where the rotational axes are fixed with respect to each other. Alternatively, the angle can be a dynamic angle that varies because one of the shafts 40, 42 can pivot about the third universal joint assembly 58 with respect to the other shaft.

For example, the center propeller shaft 42 can extend substantially parallel to a longitudinal axis LA of the vehicle 10, and can be spaced away (or offset) from the longitudinal axis LA in a transverse direction T of the vehicle 10. The front propeller shaft 40 can extend in both of the longitudinal direction L and the transverse direction T of the vehicle 10 such that the front propeller shaft 40 is at an angle with respect to the longitudinal axis LA of the vehicle 10. Further, the front propeller shaft 40 can have an axis of rotation that is at an angle with respect to an axis of rotation of each of the center propeller shaft 42 and the front input shaft 52. The third universal joint assembly 58 can include a first member connected to one end of the front propeller shaft 40 and the second member connected to one end of the center propeller shaft 42.

Figure 2:
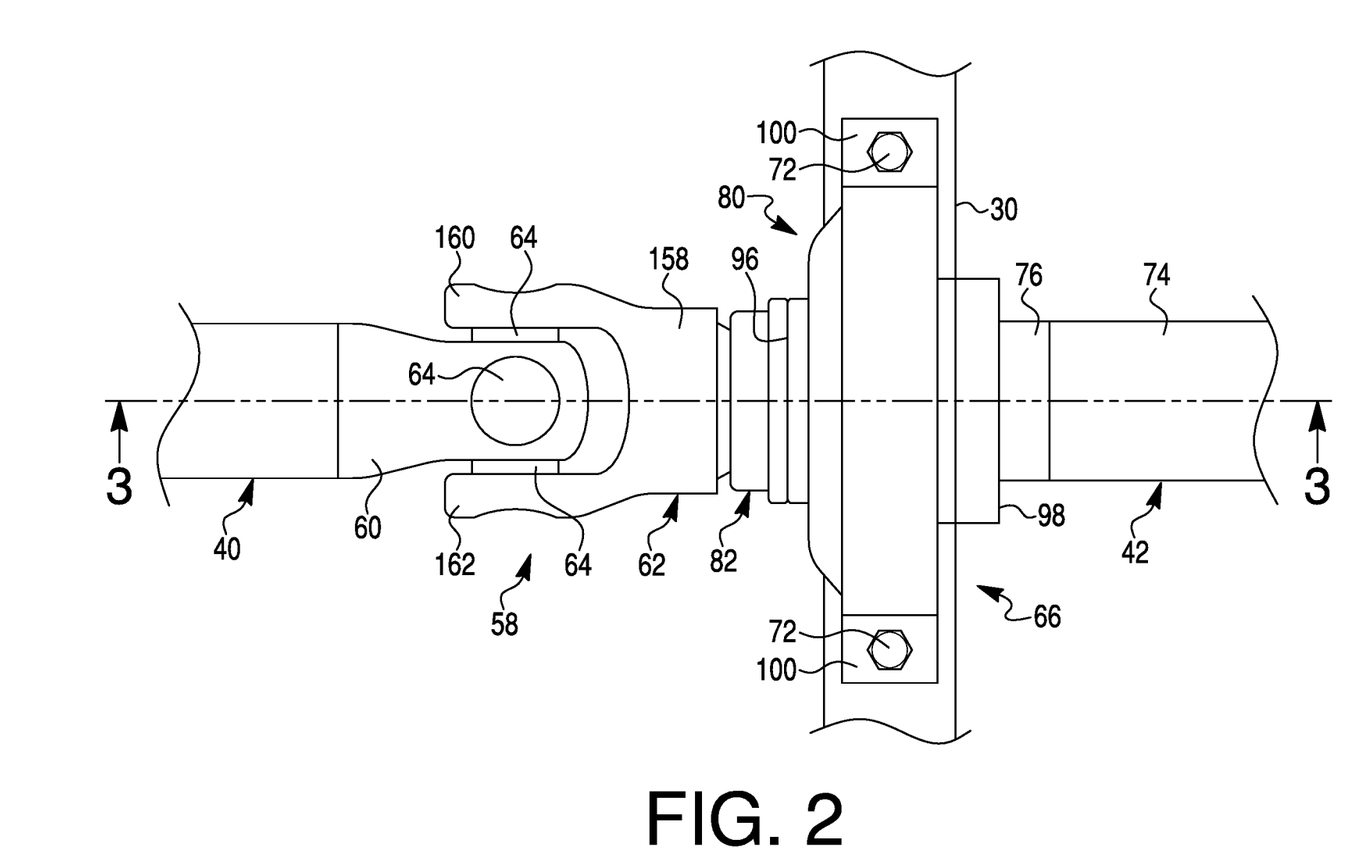
FIG. 2 is a plan view of an exemplary center bearing assembly of the vehicle of FIG. 1.

FIG. 2 shows a center bearing support assembly 66 and a portion of the front propeller shaft 40 and a portion of the center propeller shaft 42. FIG. 2 shows the front propeller shaft 40 aligned with the center propeller shaft 42 in the longitudinal direction L of the vehicle 10 to better illustrate the third universal joint assembly 58.

Referring to FIGS. 1 and 2 collectively, the third universal joint assembly 58 can include a first yoke 60, a second yoke 62 and a cross member 64. The first yoke 60 can be fixed to the front propeller shaft 40. The second yoke 62 can be connected to the center propeller shaft 42. The cross member 64 can be pivotally connected to each of the yokes 60, 62 such that the cross member 64 pivots within each of the yokes 60, 62 as the shafts 40, 42 rotate if the rotational axes of the shafts 40, 42 are at angle with respect to each other. Similarly, each of the first and second universal joints 54, 56 can include a pair of yokes and a cross member.

One or both of the propeller shafts 40, 42 can be supported on the frame assembly 18 by a center bearing support assembly 66 such that the angle between the rotational axes is a dynamic angle due to each of the following: the inertia of the shafts 40, 42; the movement of the power source 36 relative to the frame assembly 18; and, the movement of the shaft(s) 40, 42 within the respective center bearing support assembly 66. The center bearing support assembly 66 can be referred to as a center bearing assembly or as a bearing assembly. Further details of the bearing assembly 66 will be described below.

The powertrain 34 can include a pair of front driveshafts 68L, 68R and a pair of rear driveshafts 70L, 70R. The front driveshafts 68L, 68R can be connected to and driven by the front final drive assembly 46 based on the front torque input to the front final drive assembly 46 by the front propeller shaft 40. The rear driveshafts 70L, 70R can be connected to and driven by the rear final drive assembly 48 based on rear drive torque input to the rear final drive assembly 48 by the rear propeller shaft 44.

The front final drive assembly 46 can include any appropriate structure, such as but not limited to a pinion and a bevel gear assembly, a differential drive assembly, a clutch assembly, or any combination thereof, that can receive the front drive torque from the front propeller shaft 40 and distribute the front drive torque to one or both of the front driveshafts 68L, 68R.

The rear final drive assembly 48 can include any appropriate structure, such as but not limited to a pinion and a bevel gear assembly, a differential drive assembly, a clutch assembly, or any combination thereof, that can receive the front drive torque from the rear propeller shaft 44 and distribute the front drive torque to one or both of the rear driveshafts 70L, 70R.

The rear final drive assembly 48 can be identical to or different from the front final drive assembly 46. For example, the rear final drive assembly 48 can include a locking differential drive assembly that, in a first mode, can selectively drive each of the rear driveshafts 70L, 70R at the same speed or at different speeds under varying traction conditions and, in a second mode, can lock the rotation of the rear driveshafts 70L, 70R such that the rear driveshafts 70L, 70R rotate in unison independently of varying traction conditions. In contrast, the front final drive assembly 46 can include a limited-slip differential drive assembly that can selectively drive each of the front driveshafts 68L, 68R at the same speed or at different speeds under varying traction conditions in a first mode and can lock the rotation of the front driveshafts 68L, 68R such that the front driveshafts 68L, 68R rotate in unison under predetermined varying traction conditions.

Referring to FIGS. 1 and 2, the bearing assembly 66 can be mounted on the frame assembly 18 and can rotationally support the center propeller shaft 42. For example, the bearing assembly 66 can be mounted to the second transverse frame member 30. Referring to FIG. 2, the center bearing support assembly 66 can be connected to the second transverse frame member 30 by a pair of bolts 72. However, alternate embodiments of the center bearing support assembly 66 can be connected to the second transverse frame member 30 in any appropriate manner.

Figure 3:
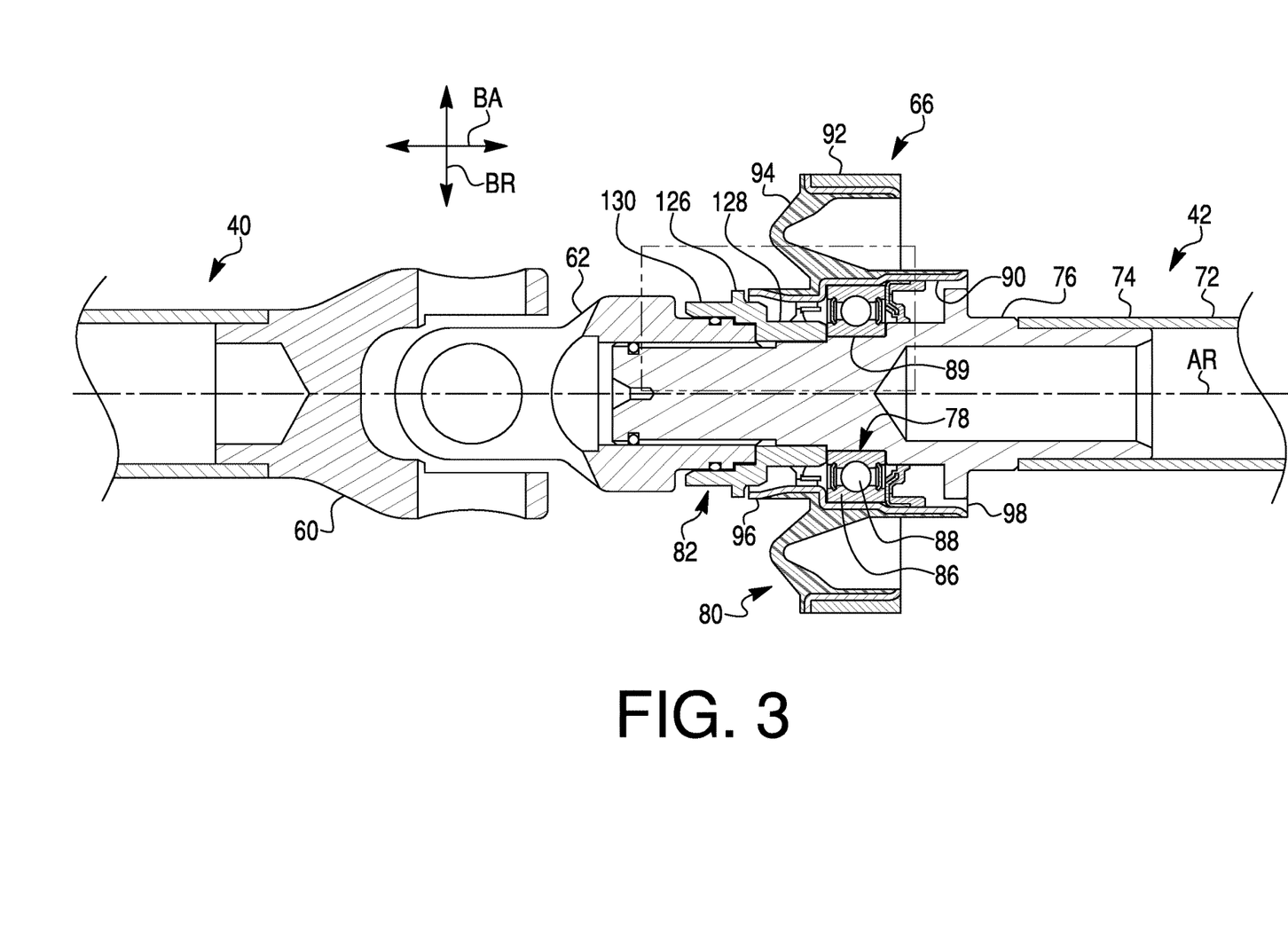
FIG. 3 is a cross-sectional view taken along line 3-3 of FIG. 2.

FIG. 3 is a cross-sectional view showing the bearing assembly 66 and a portion of the front propeller shaft 40 and a portion of the center propeller shaft 42. The yokes 60, 62 and the cross member 64 can also be referred to as components of the front propeller shaft 40. The cross member 64 is omitted from FIG. 3 for clarity and simplicity of the drawing.

The center propeller shaft 42 can include a tube shaft 74 and a stub shaft 76 connected to the tube shaft 74 in any appropriate manner such as welding, a press fit, mechanical fasteners, adhesive bonding, splines, or any combination thereof. The center propeller shaft 42 can rotate about an axis of rotation AR. The axis of rotation AR can be parallel to the longitudinal direction L of the vehicle 10. Alternate embodiments can include the center propeller shaft 42 oriented with the axis of rotation AR at an angle with respect to the longitudinal direction L of the vehicle 10.

The bearing assembly 66 can rotate about the axis of rotation AR. That is, an axial direction BA of the bearing assembly 66 can be parallel to the axis of rotation AR.

Referring to FIGS. 2 and 3 collectively, the bearing assembly 66 can include a bearing 78, a damper 80 and a retaining ring 82.

The bearing 78 can be any appropriate type of journal bearing or rolling element bearing. FIG. 3 illustrates the bearing 78 configured as a rolling element bearing that can include an inner race 84, an outer race 86 and a plurality of rolling elements 88 that engage the inner race 84 and the outer race 86. The rolling elements 88 can be configured as balls, rollers or needles. The bearing 78 shown in FIG. 3 can be configured as a ball bearing that includes a plurality of balls as the rolling elements. The inner race 84 can be press fit onto an outer surface of the stub shaft 76. The outer race 86 can be press fit on an inner surface of the damper 80.

The damper 80 can be configured to attenuate vibrations input by the center propeller 42 shaft into the bearing 78. The damper 80 can include an inner member 90, an outer member 92 and a resilient member 94. The bolts 72 can pass through the outer member 92 such that the bolts 72 connect the outer member 92 to the second transverse frame member 30. The resilient member 94 can be connected to and extend from each of the inner member 90 and the outer member 92.

The inner member 90 can be a hollow cylindrical member that extends from a first end 96 to a second end 98 in the axial direction BA of the bearing assembly 66. The inner member 90 of the damper 80 can be press fit on the outer race 86 of the bearing 78. The first and second ends 96, 98 of the inner member 90 can be spaced away from the bearing 78 along the rotational axis AR. The first end 96 can be adjacent to the retaining ring 82. The second end 98 can be spaced away from the bearing 78 such that the bearing 78 is located between the second end 98 and the retaining ring 82.

The outer member 92 can be a hollow cylindrical member. The outer member 92 can be configured to be mounted to the frame assembly 18 in any appropriate manner. For example, the outer member 92 can include or otherwise be connected to a flange 100 of the bearing assembly 66. The flange 100 can be connected to the frame assembly 18 via the bolts 72. The outer member 92 can encircle each of the inner hollow cylindrical member 90 and the resilient member 94.

Figure 4:
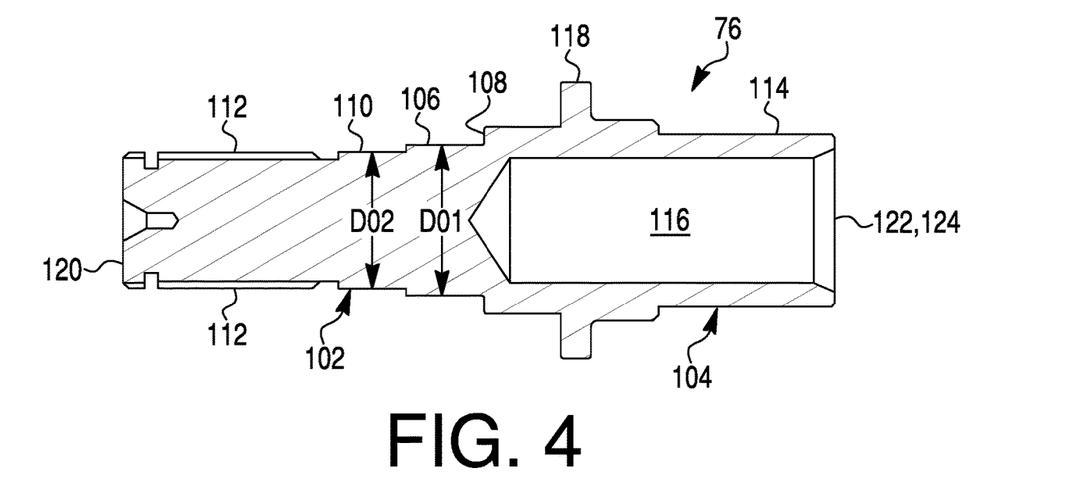
FIG. 4 is a cross-sectional view of the exemplary stub shaft of FIG. 3.

Referring to FIG. 4, the stub shaft 76 can include a solid portion 102, a hollow portion 104, a bearing shoulder 106, a radial wall 108, a retainer shoulder 110, a plurality of external splines 112, a tube shoulder 114, a blind bore 116, a flange 118, a first end 120, and a second end 122. The bearing shoulder 106, the radial wall 108, the retainer shoulder 110, the external splines 112 and the first end 120 can be located on the solid portion 102 of the stub shaft 76. The blind bore 116 can extend from an opening 124 at one end of the hollow portion 102 and terminate at a location that can be adjacent to the flange 118. The flange 118 can be spaced away from each of the ends 120, 122. The flange 118 can be located on the hollow portion 104.

Referring to FIGS. 3 and 4 collectively, the bearing 78 can be press fit onto the bearing shoulder 106. The inner race 84 of the bearing 78 can abut the radial wall 108 of the retaining ring 82.

It is possible that the tolerance variation for an outer diameter D01 of the bearing shoulder 106 can affect the interference amount between the inner surface of the inner race 84 and the outer surface of the bearing shoulder 106. For example, it can be desirable to achieve a predetermined pre-loading between the bearing 78 and the stub shaft 76 by setting a predetermined minimum by which the outer diameter D01 of the bearing shoulder 106 exceeds the inner diameter of the inner race 84. Thus, it is possible that the tolerance variation for the outer diameter D01 of the bearing shoulder 106 can cause a predetermined hoop stress in the inner race 84 of the bearing after the inner race 84 is press fit onto the bearing shoulder 106. It can be difficult to manage the predetermined hoop stress if the bearing 78 is configured to account for the full tolerance variation for the outer diameter D01 of the bearing shoulder 106. However, if the predetermined hoop stress is set as the parameter objective, it is possible that the pre-load achieved between the bearing 78 and the stub shaft 76 after the bearing 78 is press fit on the stub shaft 76 might be less than an advantageous pre-load value. The advantageous pre-load can result in a frictional force between the inner race 84 and the bearing shoulder 106 that is sufficient to prevent relative rotation between inner race 84 and the bearing shoulder 106. This advantageous pre-load can provide one or more additional benefit(s) such as but not limited to enabling the rolling elements 88 to be in tight contact with the inner and outer races 84, 86 without binding when the center propeller shaft 42 rotates. Thus, the retaining ring 82 can be configured to contribute to the pre-load such that the inner race 84 can be configured to account for the full tolerance variation set for the outer diameter D01 of the bearing shoulder 106.

Figure 5:
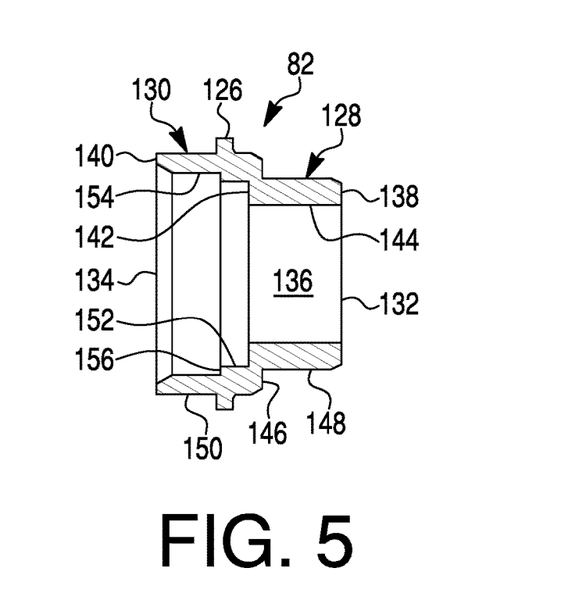
FIG. 5 is a cross-sectional view of the exemplary retaining ring of FIG. 3.

Referring to FIG. 5, the retaining ring 82 can be a hollow cylindrical structure. The retaining ring 82 can include a flange 126, a first annular portion 128, a second annular portion 130, a first opened end 132, a second opened end 134, a through bore 136, a first end face 138, a second end face 140, and an inner annular face 142.

Figure 8:
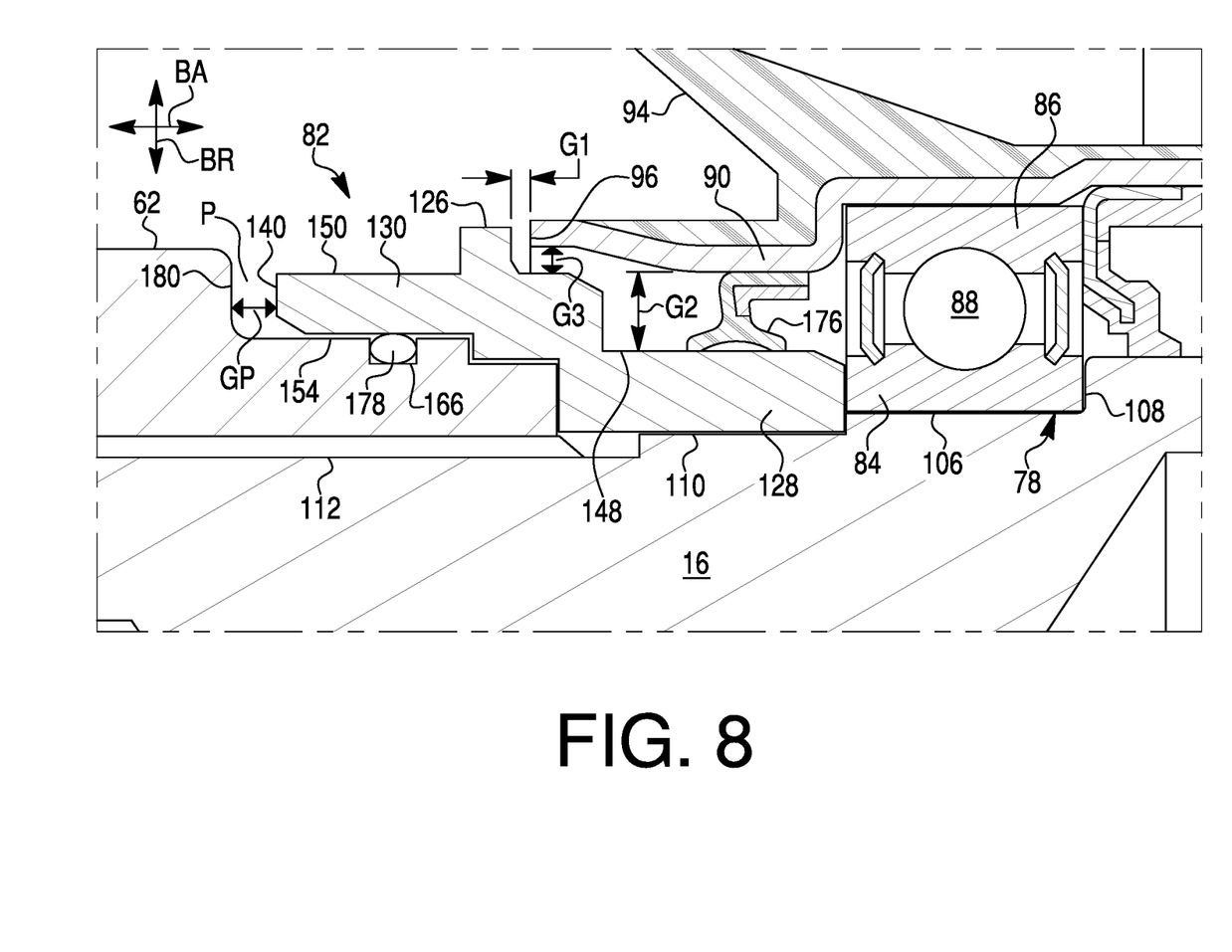
FIG. 8 is an enlarged portion of FIG. 3.

The first annular portion 128 can be press fit on the center propeller shaft 42. Referring to FIGS. 4, 5, and 8 collectively, the first annular portion 128 can include an inner cylindrical surface 144 that has a first inner diameter D1. The first inner diameter D1 can be smaller than outer diameter D02 of the retainer shoulder 110 such that the first annular portion 128 can be press fit onto the retainer shoulder 110. The retaining ring 82 can be configured such that at least the first annular portion 128 can accommodate the hoop stresses across the full tolerance range permitted for the outer diameter D02 of the retainer shoulder 110.

The first annular portion 128 can terminate at the first end face 138. The first end face 138 can be a radial end face. The first end face 138 can abut the inner race 84 of the bearing 78. Further, the retaining ring 82 can be located on the retainer shoulder 110 such that the retaining ring 82 applies a force to the inner race 84 along the axial direction BA of the bearing assembly 66. This axial force can push the inner race into contact with the radial wall 108 on the stub shaft 76. The press fit between the first annular portion 128 and the retainer shoulder 110 can be configured to maintain the inner race 84 in compression between the first end face 138 and the radial wall 108 such that the frictional forces between the inner race 84 and each of first end face 138 and the radial wall 108 contributes to the frictional force caused by the press fit between the inner race 84 and the bearing shoulder 106. Thus, the press fit pre-load between the inner race 84 and the bearing shoulder 106 can be reduced to permit the bearing 78 to accommodate the tolerance variation for the outer diameter D01 of the bearing shoulder 106 without adversely affecting the hoop stress generated in the inner race 84 due to the press fit.

The retaining ring 82 is spaced away from the rolling elements 88 and the outer race 86. Further, the retaining ring does not (or does not substantially) transfer the static load or the rotational load imparted by the center propeller shaft 42 onto the bearing 78. Thus, the retaining ring 82 can be configured to accommodate the full range of hoop stress that can be imparted by the tolerance variation for the outer diameter D02 of the retainer shoulder 110.

Referring to FIG. 5, the flange 126 can be an annular flange. The flange 126 can be located on the second annular portion 130 and can be spaced away from the first annular portion 128. The flange 126 can be at a location on the second annular portion 130 that is closer to the first annular portion 128 than to the second end face 140. Referring to FIG. 3, the flange 126 can oppose the first end 96 of the inner member 90.

The second annular portion 130 can terminate at an intermediate radial face 146. The first annular portion 128 can extend from the intermediate radial face 146 to the first end face 138. The first annular portion 128 can include an outer surface 148 that extends from the intermediate radial face 146 to the first end face 138. The outer surface 148 can be a cylindrical surface.

The second annular portion 130 can terminate at the second end face 140. That is, the second annular portion 130 can extend from the second end face 140 to the intermediate radial face 146. The second end face 140 can be a radial end face. The second annular portion 130 can include an outer surface 150, a first inner surface 152 a second inner surface 154 and an inner annular face 156. Each of the outer surface 150, the first inner surface 152 and the second inner surface 154 can be a cylindrical surface. The flange 126 can extend away from the outer surface 150 of the second annular portion 130.

Referring to FIGS. 3 and 5, the first annular portion 128 can be encircled by the inner member 90 of the damper 80. The outer surface 148 of the first annular portion 128 can extend along the inner member 90 in the axial direction BA of the bearing assembly 66. The second annular portion 130 can extend inside the inner member 90 and can extend outside the inner member 90 in the axial direction BA of the bearing assembly 66. That is, the second annular portion 130 can include a portion between the flange 126 and the intermediate radial face 146 that is encircled by the inner member 90, and a portion between the flange 126 and the second end face 140 that is at location that is outside of the damper 80 and surrounds a portion of the front propeller shaft 40.

The second annular portion 130 of the retaining ring 82 can be spaced away from the center propeller shaft 42. The second annular portion 130 can extend around an outer portion of the front propeller shaft 40.

Figure 6:
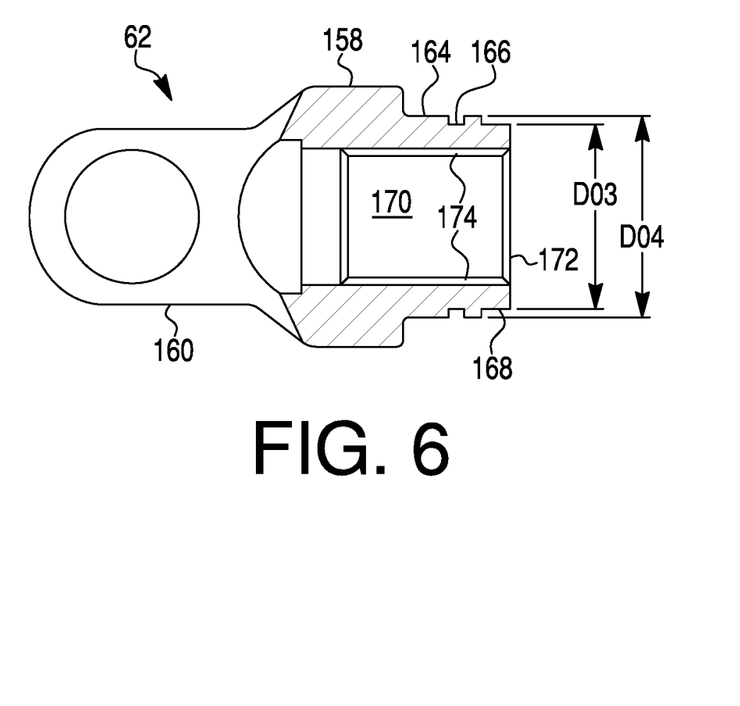
FIG. 6 is a cross-sectional view of the exemplary yoke of FIG. 3.

Referring to FIGS. 3 and 6 collectively, the second yoke 62 can include a shaft 158, a pair of arms 160, 162, an outer surface 164, a groove 166, a shoulder 168, a bore 170, an opened end 172 and a plurality of splines 174. The arms 160, 162 can be connected to and extend from the shaft 158. The outer surface 164 can be on the shaft 158. The outer surface 164 can be a cylindrical surface. The groove 166 can be formed on the shaft 158 and recessed from the outer surface 164. The bore 170 can be formed in the shaft and can extend from the opened end 172. The bore 170 can be a through bore or a blind bore. The splines 174 can be formed in the bore 170 along an inner surface of the shaft 158. FIG. 6 only shows two diametrically opposed splines 174. However, the second yoke 62 can include any number of splines 174 space circumferentially about the inner surface of the shaft 158.

The splines 174 of the second yoke 62 can engage the splines 112 formed on the stub shaft 76 to permit relative movement in the axial direction BA of the bearing assembly 66. The splines 112 transmit torque form the stub shaft 76 to splines 174 in the second yoke 62. Referring to FIGS. 3 and 5 collectively, the shaft 158 can abut the inner annular face 142 such that the inner annular face 142 can limit movement of the front propeller shaft 40 toward the center propeller shaft 42 along the axial direction BA of the bearing assembly 66.

The retaining ring 82 can be configured such that first annular portion 128 is press fit onto the retaining shoulder 119 of the stub shaft 76 and the second annular portion 130 is spaced away from the stub shaft 76 in the radial direction BR of the bearing assembly 66. Further, the retaining ring 82 can be configured to permit relative movement between the second yoke 62 and the retaining ring 82 in the axial direction BA of the bearing assembly 66.

Figure 7:
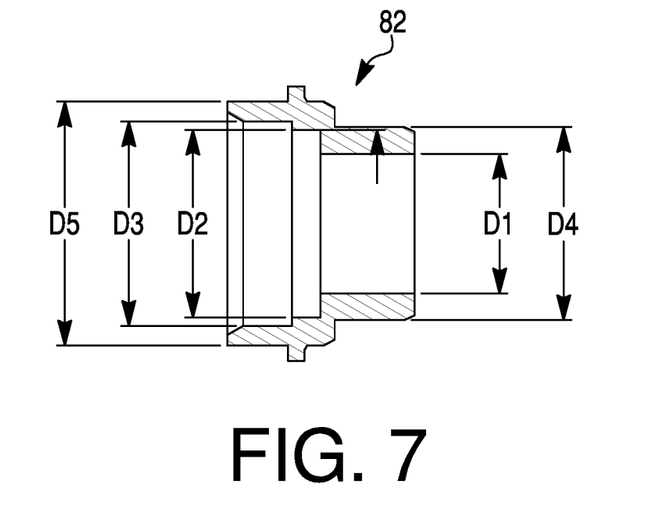
FIG. 7 is a cross-sectional view of the exemplary retaining ring of FIG. 3 and showing dimensional features of the retaining ring.

As discussed above, the first inner diameter D1 of the inner surface 144 of the first annular portion 128 of the retaining ring 82 can be less that the outer diameter D02 of the retainer shoulder 110 of the stub shaft 76 to provide a press fit therebetween. Referring to FIGS. 5 and 7 collectively, the first inner surface 152 of the second annular portion 130 can have second inner diameter D2 that is greater than the outer diameter D02. The second inner surface 154 of the second annular portion 130 can have third inner diameter D3 that is greater than the outer diameter D02. That is, the second annular portion 130 can be spaced away from the stub shaft 76 in the radial direction BR of the bearing assembly 66. Further, the outer surface 148 of the first annular portion 128 can have a fourth outer diameter D4 that is less than a fifth outer diameter D5 of the outer surface 150 of the second annular portion 130.

Referring to FIG. 6, the outer surface 164 of the second yoke 62 can have an outer diameter D03 that is less than the second inner diameter D2 of first inner surface 152 of the retaining ring 82. The shoulder 168 of the second yoke 62 can have an outer diameter D04 that is less than the third inner diameter D3 of the second inner surface 154 of the retaining ring 82.

Referring to FIG. 8, the retaining ring 82 can be configured to provide protection from the environment. That is, the retaining ring 82 can cooperate with adjacent structure(s) to define a non-linear debris path that extends from the outer surface of the retaining ring to the bearing 78. For example, retaining ring 82 can cooperated with the damper 80 to define three gaps G1, G2, G3 that form a debris path that extends along at least two different directions.

The flange 126 can oppose the first end 96 of the inner member 90 and can be spaced away from the first end 96 in the axial direction BA of the bearing assembly 66 by a first gap G1. The first gap G1 can be measured in the axial direction BA.

The outer surface 148 of the first annular portion 128 can extend along the inner member 90 in the axial direction BA. The outer surface 148 can oppose and be spaced away from the inner member 90 in a radial direction BR of the bearing assembly 66 by a second gap G2. The outer cylindrical surface of the second annular portion 130 can extend along the inner member 90 in the axial direction BA and can be spaced away from the inner member 90 in the radial direction BR by a third gap G3. The second and third gaps G2, G3 can be measured in the radial direction BR.

A bearing seal 176 can seal the bearing 78 from the space formed by the second gap G2. Specifically, the bearing seal 176 can be secured to the inner member 90 and can span the space formed by the second gap G2. The bearing seal 176 can engage the outer surface 148 of the first annular member.

Further, the third gap G3 can have an absolute value that is greater than the absolute value of the first gap G1 and smaller than the absolute value of the second gap G2. That is, the smallest gap (the first gap G1) is formed at the entrance of the debris path; thereby restricting the size of the debris and the volume of debris that can enter the debris path. Further, debris that enters the into the first gap G1 must change directions at the outer surface 148 on the first annular portion 128 of the retaining ring 82 and pass through another relatively small gap (second gap G2).

The gaps G1, G2, G3 can be configured to provide a debris path to the bearing 78 that includes a first path that passes through the first gap G1 in the radial direction BR and terminates at the outer cylindrical surface 150 of the second annular portion 130 and a second path that passes through the third gap G3 gap in the axial direction BA and enters the space formed by the second gap G2.

Figure 9:
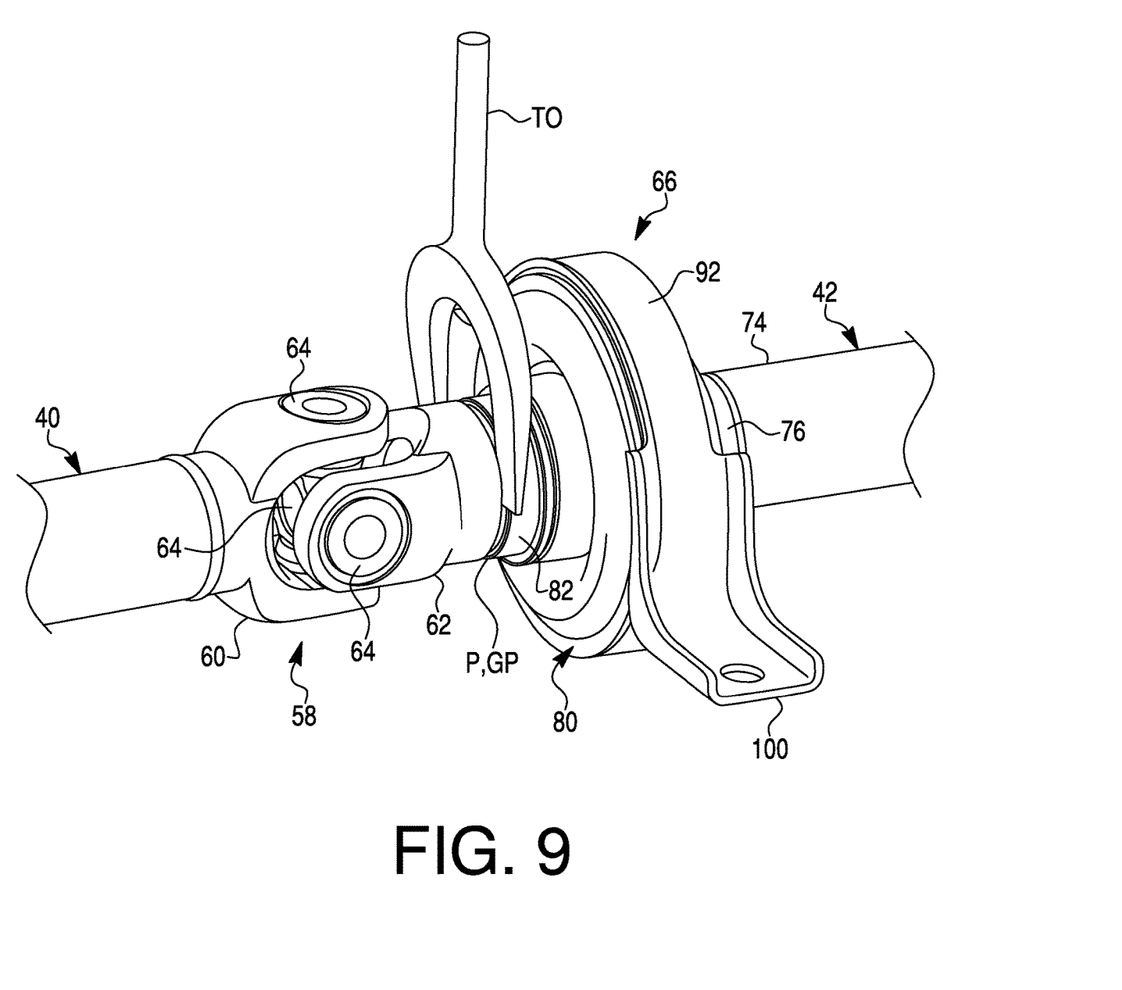
FIG. 9 is a perspective view of the center bearing assembly of FIG. 2 showing a pry point and tool used for disassembly of the front propeller shaft from the center propeller shaft.

Thus, the retaining ring 82 can provide protection to the bearing assembly 66 from debris and fluids in the environment in which the vehicle 10 operates Referring to FIGS. 8 and 9, the retaining ring 82 can include a pry point P that facilitates disassembly of the front propeller shaft 40 from the center propeller shaft 42. The pry point P can be configured for engagement by a tool TO in order to separate the front propeller shaft 40 shaft from the center propeller shaft 42 when the front propeller shaft 40 is removably coupled to the center propeller shaft 42. The pry point P can include a pry gap GP that separates the second end face 140 of the retaining ring 82 from a radial wall 180 of the second yoke 62. For example, the tool TO can be inserted into the pry gap GP as shown in FIG. 9. Then, the tool TO can be rocked back and forth in the pry gap P to alternately pushing on radial wall 180 of the second yoke 62 until the second yoke 62 is disengaged from the stub shaft 76. Thus, the pry point P can provide access for the tool TO to engage the second yoke 62 such that the tool can be used to displace the second yoke 62 in the axial direction BA away from the stub shaft 76.

Referring to FIG. 8, the retaining ring 82 can be configured to cooperate with an O-ring 178 and the second yoke 62 to seal a space between the front propeller shaft 40 and the center propeller shaft 42. The O-ring 178 can be seated in the groove 166 of the second yoke 62. The second inner surface 154 can engage the O-ring 178 as the shaft 158 of the second yoke 62 slides relative to each of the retaining ring 82 and the stub shaft 76 in the axial direction BA of the bearing assembly 66. The second annular portion 130 can be configured such that the second inner surface 154 engages the O-ring 178 through the full stroke permitted by the second yoke 62 along the axial direction BA.

While certain embodiments of the invention are described above, it should be understood that the invention can be embodied and configured in many different ways without departing from the spirit and scope of the invention.

For example, embodiments are disclosed above in the context of bearing assembly 66 associated with front propeller shaft 40 and a center propeller shaft 42 that can have rotational axes that intersect at an angle such that a universal joint assembly (i.e., the second universal joint assembly 58) rotationally connects the shafts 40, 42. However, embodiments can include the bearing assembly 66 mounted on any appropriate shaft of a torque transmitting drivetrain. Exemplary embodiments can include a retaining ring and a bearing that are press fit onto a shaft at a location that is within a housing or casing that encloses the bearing 78 and at least a portion of the retaining ring.

Exemplary embodiments can omit the damper 80 from the bearing assembly 66. Exemplary embodiments can omit the front propeller shaft 40. Exemplary embodiments can omit the universal joint assembly 58, if appropriate, and can connect the propeller shafts 40, 42 via bolted flanges on each of the shafts 40, 42 or by engaging respective splines on each of the shafts.

The splines 112 on the stub shaft 76 can be external splines and the splines 174 on the second yoke 62 can be internal splines. However, exemplary embodiments are intended to include a reversal of this splined arrangement such that the shaft 158 of the second yoke 62 is inserted into a hollow portion of the stub shaft 76.

Exemplary embodiments can include a stub shaft that is solid from end to end. Exemplary embodiments can omit the tube shaft 74 and can extend the stub shaft 76 to any appropriate length. The tube shaft 74 can be a hollow cylindrical tube that is formed from any appropriate material such but not limited a metal, a metal alloy, carbon fiber, fiber reinforced plastic, or a composite of one or more of these exemplary materials.

Exemplary embodiments can include any type of rolling element bearing including but not limited to a roller bearing, a tapered roller bearing, a double row tapered roller bearing, a double row ball bearing and needle bearing.

The front propeller shaft 40 and the third universal joint assembly 58 can be collectively referred to as a front driveshaft. Alternatively, at least the second yoke 62 of the third universal joint 58, the stub shaft 76, and the tube shaft 74 can be referred to as a center driveshaft.

What is claimed is:

1. A bearing assembly for supporting a rotating shaft on a vehicle structure, the bearing assembly comprising:
    a rolling element bearing including,
        an inner race configured to be press fit on the rotating shaft,
        an outer race surrounding the inner race and configured to be mounted on the vehicle structure, and
        a plurality of rolling elements located between and engaging each of the inner race and the outer race; and
    a retaining ring configured to be press fit on the rotating shaft and abutting the inner race when the rolling element bearing and the retaining ring are press fit on the rotating shaft, and the press fit between the retaining ring and the rotating shaft contributes to the press fit between the inner race and the rotating shaft such that the retaining ring and the rolling element bearing together distribute a load input by the rotating shaft to the vehicle structure, the retaining ring includes,
        a first end face,
        a second end face spaced away from the first end face, the retaining ring terminates at each of the first end face and the second end face,
        a flange spaced away from each of the first end face and the second end face, and
        a cylindrical outer surface that extends from the flange to the second end face.

2. The bearing assembly according to claim 1, further comprising a damper configured to attenuate vibrations transmitted from the rotating shaft to the rolling element bearing, the damper is connected to the outer race and configured to be mounted on the vehicle structure,
    the damper includes an inner hollow cylindrical member that extends from a first end to a second end in an axial direction of the bearing assembly, the inner cylindrical member is connected to the outer race,
    the flange opposes the first end of the inner hollow cylindrical member and is spaced away from the first end of the inner hollow cylindrical member in the axial direction by a first gap,
    the retaining ring includes,
        a first outer cylindrical surface that extends along the inner hollow cylindrical member in the axial direction, and the first outer cylindrical surface is spaced away from the inner hollow cylindrical member in a radial direction of the bearing assembly by a second gap, and
        a second outer cylindrical surface that extends along the inner hollow cylindrical member in the axial direction and is spaced away from the inner hollow cylindrical member in the radial direction by a third gap that is greater than the first gap,
    such that a debris path to the rolling element bearing includes a first path that extends along the first gap in the radial direction and terminates at the first outer cylindrical surface and a second path that extends along the second gap in the axial direction.

3. The bearing assembly according to claim 2, further comprising a bearing seal mounted on the inner hollow cylindrical member and extending across the second gap to engage the retaining ring.

4. The bearing assembly according to claim 1, wherein the retaining ring is configured to form at least a portion of a pry point that is engagable by a tool in order to separate a second shaft from the rotating shaft when the second shaft is removably coupled to the rotating shaft.

5. The bearing assembly according to claim 4, wherein the retaining ring includes:
a first hollow cylindrical portion that is configured to be press fit onto the rotating shaft; and
a second hollow cylindrical portion that is spaced away from the rotating shaft,
the first hollow cylindrical portion terminates at the first end face and the first end face abuts the inner race when the rolling element bearing and the retaining ring are mounted on the rotating shaft,
the second hollow cylindrical portion terminates at a second end face,
the second hollow cylindrical portion includes the cylindrical outer surface, and
the pry point extends along the cylindrical outer surface.

6. The bearing assembly according to claim 1, wherein the retaining ring includes an inner annular surface that engages a seal mounted on a second shaft that is configured to be connected to the rotating shaft to rotate with the rotating shaft and to slide relative to each of the retaining ring and the rotating shaft in the axial direction.

7. A bearing assembly for supporting a rotatable driveshaft on a vehicle structure, the bearing assembly comprising:
a bearing that is configured to be press fit on the rotatable shaft; and
a retaining ring that abuts the bearing when the retaining ring and the bearing are mounted on the rotatable shaft, the retaining ring includes:
a first hollow cylindrical portion that is configured to be press fit onto the rotatable shaft;
a second hollow cylindrical portion that is spaced away from the rotatable shaft when the retaining ring is mounted on the rotatable shaft;
a first radial face having an outer diameter;
a second radial face, the retaining ring terminates at each of the first radial face and the second radial face, the second radial face having an outer diameter; and
a flange having an outer diameter that is greater than the outer diameter of each of the first radial face and the second radial face; and
a cylindrical outer surface that extends from the flange to the second end face.

8. The bearing assembly according to claim 7, wherein the first hollow cylindrical portion includes a first inner surface having a first diameter, and
the second hollow cylindrical portion includes,
a second inner surface having a second diameter that is greater than the first diameter, and
a third inner surface having a third diameter that is greater than the first diameter and the second diameter,
the first radial face extends from and is connected to the first inner surface and the second inner surface, and
the second radial face extends from and is connected to the second inner surface and the third inner surface.

9. The bearing assembly according to claim 8, wherein the first hollow cylindrical portion has a first outer diameter, and
the second hollow cylindrical portion has a second outer diameter that is greater than the first outer diameter.

10. A driveshaft assembly for a vehicle including a frame assembly, a power source mounted to the frame assembly, and at least one driven wheel connected on the frame assembly, the driveshaft assembly comprising:

a front driveshaft connected to drive the at least one driven wheel;
a center driveshaft configured to transmit torque from the power source to the front driveshaft; and
a center bearing support assembly configured to rotatably support the center driveshaft relative to a frame assembly, the center bearing support assembly including,
a bearing press fit on the center driveshaft; and
a retaining ring press fit on the center driveshaft and abutting the bearing such that the retaining ring and the bearing together distribute a load input by the center driveshaft to the frame assembly via the bearing support assembly, and retaining ring extends along each of the front driveshaft and the center driveshaft in an axial direction.

11. The driveshaft assembly according to claim 10, wherein the retaining ring includes,
a first annular portion press fit on the center driveshaft, and
a second annular portion spaced away from the center driveshaft and extending around an outer portion of the front driveshaft.

12. The driveshaft assembly according to claim 8, further comprising a seal mounted on the outer portion of the front driveshaft,
the front driveshaft is connected to the center driveshaft to rotate in unison with the center driveshaft and to move relative to the center driveshaft along an axial direction of the center driveshaft,
the second annular portion includes an inner surface that opposes the outer portion of the front driveshaft, and
the inner surface of the second annular portion engages the seal as the front driveshaft moves along the axial direction.

13. The driveshaft assembly according to claim 12, wherein the retaining ring further includes an inner annular face configured to limit movement of the front driveshaft toward the center driveshaft along the axial direction.

14. The driveshaft assembly according to claim 8, wherein the second annular portion extends along each of the front driveshaft and the center driveshaft.

15. The driveshaft assembly according to claim 8, wherein
the bearing includes,
an inner race press fit on the center driveshaft,
an outer race surrounding the inner race and configured to be mounted on the vehicle structure, and
a plurality of rolling elements located between and engaging each of the inner race and the outer race, and
the first hollow cylindrical portion abuts the inner race.

16. The driveshaft assembly according to claim 10, further comprising:
a damper configured to attenuate vibrations input by the center driveshaft into the bearing, the damper includes an inner circumferential surface that is mounted to the bearing,
a space that extends between the between the inner circumferential surface and the retaining ring; and
a bearing seal engaging the inner circumferential surface and the retaining ring such that the bearing seal seals the bearing from the space.

17. The driveshaft assembly according to claim 16, wherein the retaining ring includes,
a first portion that is located within the space and is spaced away from and opposes the inner circumferential surface, and a second portion extending outside of the damper and surrounding a portion of the front driveshaft.

18. The driveshaft assembly according to claim 17, wherein the damper includes,
   an inner hollow cylindrical member that defines the space, abuts the bearing, and includes the inner circumferential surface,
   an outer hollow cylindrical member that is configured to be mounted to the frame assembly and extends around the inner hollow cylindrical member, and
   a resilient member extending from and connected to each of the inner hollow cylindrical member and the outer hollow cylindrical member.

19. The driveshaft assembly according to claim 18, wherein
   the inner hollow cylindrical member extends along the first and second portions of the retaining ring in an axial direction of the center driveshaft,
   the retaining ring includes a flange that is spaced away from and opposes the inner hollow cylindrical member to define a first gap.

20. The driveshaft assembly according to claim 19, wherein the retaining ring includes,
   a first outer cylindrical surface that extends from the flange and along the inner hollow cylindrical member in the axial direction, and the first outer cylindrical surface is spaced away from the inner hollow cylindrical member in a radial direction of the bearing assembly by a second gap, and
   a second outer cylindrical surface extends along the inner hollow cylindrical member in the axial direction and is spaced away from the inner hollow cylindrical member in the radial direction by a third gap that is greater than the first gap,
   such that a debris path to the bearing includes a first path that extends along the first gap in the radial direction and terminates at the first outer cylindrical surface and a second path that extends along the second gap in the axial direction.

* * * * *